(12) United States Patent
Fischer (10) Patent No.: US 10,852,714 B2
(45) Date of Patent: Dec. 1, 2020

(54) PRODUCTION PLANNING SYSTEM AND METHOD

(71) Applicant: TRUMPF Werkzeugmaschinen GmbH + Co. KG, Ditzingen (DE)

(72) Inventor: Stephan Fischer, Karlsruhe (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 46 days.

(21) Appl. No.: 16/131,140

(22) Filed: Sep. 14, 2018

(65) Prior Publication Data

US 2019/0086904 A1 Mar. 21, 2019

Related U.S. Application Data

(63) Continuation of application No. PCT/EP2017/055749, filed on Mar. 10, 2017.

(30) Foreign Application Priority Data

Mar. 16, 2016 (DE) ........................ 10 2016 204 392

(51) Int. Cl.
*G05B 19/418* (2006.01)

(52) U.S. Cl.
CPC .................. *G05B 19/41865* (2013.01); *G05B 2219/32247* (2013.01); *G05B 2219/32297* (2013.01);
(Continued)

(58) Field of Classification Search
CPC .... G05B 19/41865; G05B 2219/32247; G05B 2219/32423; G05B 2219/32301;
(Continued)

(56) References Cited

U.S. PATENT DOCUMENTS

| 7,085,614 | B1 * | 8/2006 | Gartland | .......... | G05B 19/41865 |
| | | | | | 700/100 |
| 2003/0163296 | A1 * | 8/2003 | Richards | ............. | G06F 17/5036 |
| | | | | | 703/14 |

(Continued)

FOREIGN PATENT DOCUMENTS

| DE | 11 2006 000 397 | 4/2008 |
| EP | 1 693 729 | 8/2006 |

(Continued)

OTHER PUBLICATIONS

Hoperoft et al., "Introduction to Automata Theory, Languages and Computation," 1979, Chapter 2, 59 pages (with English translation).

(Continued)

*Primary Examiner* — Thomas C Lee
*Assistant Examiner* — Anzuman Sharmin
(74) *Attorney, Agent, or Firm* — Fish & Richardson P.C.

(57) ABSTRACT

The invention relates to production planning systems and methods. A production optimization system is provided which has the following: a production environment with at least one first machine, a second machine, a distribution unit configured to be connected to the first machine and the second machine via a communication network and to ascertain the machine state thereof, and an optimization unit configured to generate a production plan where at least one task for producing a product is separated into machine-specific sub-tasks for the first machine or the second machine, said sub-tasks being provided with a sequence for the first machine or the second machine. The distribution unit ascertains the next occurring sub-task for the first machine or the second machine from the optimization unit while taking into consideration the respective machine state, to remove the sub-task from the production plan, and to assign the sub-task to the respective machine.

16 Claims, 5 Drawing Sheets

(52) U.S. Cl.
CPC .............. *G05B 2219/32301* (2013.01); *G05B 2219/32423* (2013.01); *Y02P 90/02* (2015.11)

(58) Field of Classification Search
CPC ........... G05B 2219/32297; Y02P 90/26; Y02P 90/265; Y02P 90/20; Y02P 90/18
See application file for complete search history.

(56) References Cited

U.S. PATENT DOCUMENTS

| | | | |
|---|---|---|---|
| 2003/0195648 A1* | 10/2003 | Bacin | G05B 19/41865 700/100 |
| 2014/0067108 A1* | 3/2014 | Pedigo | G05B 19/41865 700/108 |
| 2014/0195865 A1* | 7/2014 | Ikegami | G06F 11/3055 714/57 |

FOREIGN PATENT DOCUMENTS

| | | |
|---|---|---|
| WO | WO 2006/091307 | 8/2006 |
| WO | WO 2008/030637 | 3/2008 |
| WO | WO 2015/167491 | 11/2015 |

OTHER PUBLICATIONS

International Search Report and Written Opinion in Application No. PCT/EP2017/055749, dated Jul. 13, 2017, 22 pages (with English translation).
Rez & Wender, "Neuronal Networks," 2nd ed., Huber, 2011, Introduction & Chapter 1, 31 pages (with English translation).

* cited by examiner

PRODUCTION PLANNING SYSTEM AND METHOD

CROSS REFERENCE TO RELATED APPLICATIONS

This application is a continuation of and claims priority under 35 U.S.C. § 120 from PCT Application No. PCT/EP2017/055749 filed on Mar. 10, 2017, which claims priority from German Application No. DE 10 2016 204 392.7, filed on Mar. 16, 2016. The entire contents of each of these priority applications are incorporated herein by reference.

TECHNICAL FIELD

The invention relates to a production planning system and method, and in particular relates to such a production planning system and method taking into account the state of the means of production.

BACKGROUND

Modern production environments consist of a large number of heterogeneous, often redundant means of production. These means of production consist of machines, wherein in this patent machines cover all processing facilities, for example for laser processing, for punching or bending, and equipment such as laser beam sources, plasma- or induction-generators.

A specific product may have to go through several processing steps as the case may be at several stations or machines for its manufacture, whereby often several machines are available for a specific processing step. Thereby, the processing steps can be time-dependent to each other. For example, when manufacturing a product assembled from two components, the processing steps of cutting a first sheet metal blank from a sheet metal, then bending it into its final shape, cutting a second sheet metal blank, then afterwards bending it into its final shape, assembling the first sheet metal blank and the second sheet metal blank, and then painting it, can occur. Thereby, time-dependencies exist in so far as the cutting-out of the two sheet metal blanks must take place before they are bent, the assembling of the sheet metal blanks must take place after their completion and the painting must take place after the assembling. The respective manufacture and processing of the two sheet metal blanks, on the other hand, can take place independently of each other, so that for example at first the cutting-out of the first sheet metal blank and then the cutting-out of the second sheet metal blank, then the bending of the first and then the bending of the second sheet metal blank can take place. If several machines are available in the production environment for carrying out the respective processing steps, one or more of the steps for manufacturing the sheet metal blanks can be carried out in parallel. Depending on the complexity of the sheet metal blank and the nature of the cutting machine, it can be advantageous to cut-out both components on a cutting machine in succession from one sheet metal, which requires only one clamping process and possibly a tool change, or to cut-out from two sheet metals in parallel on two cutting machines, which can half the processing time for complex and long cutting processes.

Even with simple production processes as those described above, the planning effort can quickly reach a high complexity, which grows exponentially with the addition of further processing steps, components, and products, taking into account specified final production deadlines, high quantities and machine breakdowns. As a rule, production planning is carried out computer-aided. This can be a rough planning from an enterprise resource planning system, which only allows for a rough planning of production means and deadlines, or a detailed planning, in which processing times are determined and used, taking into account construction plans.

In prior art it is known to use deterministic finite state machines or neural networks for modelling or controlling work steps to control production processes in multi-part production processes. Finite state machines are known to a person skilled in the art for instance from John E. Hoperoft, Jeffrey Ullman, "Einführung in die Automatentheorie, formale Sprachen and Komplexitätstheorie", $2^{nd}$ Edition, 1990 Addison-Wesley, which content is herein comprised entirely. Neural networks are known to a person skilled in the art, for instance from Günter Daniel Rey, Karl F. Wender, "Neuronale Netze", $2^{nd}$ Edition, 2010, Huber, which content is herein comprised entirely.

For example, WO 2008/030637 discloses the use of finite state machines and neural networks for controlling and for process modelling in wafer handling in a semiconductor manufacturing environment. This publication discloses a semiconductor processing system with wafer handling hardware.

In production planning according to prior art, the planning is carried out decoupled from actual production.

Therein, it is disadvantageous that the production planning can only take into account insufficiently the current resource state. It is indeed possible—if corresponding information is available for production planning—to take the current resource state into account during the planning process. After completion of the planning process, on the other hand, changes in the resource state, such as the failure of a specific machine tool, are no longer taken into account. The known production planning also reacts inflexible to ad-hoc tasks that have to be integrated into an already existing production planning.

SUMMARY

It is thus an objective of the invention to overcome the disadvantages known from the prior art, and to provide in particular a system and a process that enable to take into account current resource states in production planning.

This object is solved by a system according to claim 1 and a process according to claims 10 and 14.

Further advantageous embodiments are subject-matter of the dependent claims.

Disclosed is a production optimization system comprising: A production environment comprising at least a first machine and a second machine, a distribution unit configured to be connected with the first machine and the second machine via a communication network and to determine the machine condition thereof, and an optimization unit configured to create a production plan in which at least one task for manufacturing of a product is divided into machine-specific sub-tasks for the first machine or the second machine, and provided for the first machine or the second machine in a task, wherein the distribution unit is set up, taking into account the respective state of the machine to determine the next pending sub-task for the first machine or the second machine from the optimization unit, remove it from the production planning and assign it to the respective machine. Further disclosed is an optimization process carried out by an optimization unit, comprising the steps: modelling of a production environment comprising at least a machine, receiving at least one task for production of a product, creating sub-tasks from the one task as work steps for at least one machine, assigning the sub-tasks to the at least one machine as production plan after receiving a task or after removing a sub-task by a distribution unit or after expiration of a predetermine timespan after the last removal of a sub-task by the distribution unit.

Moreover, a distribution method is disclosed, carried out by a distribution unit (120), comprising the steps: ascertaining the state of at least one machine from a production environment, ascertaining whether the production planning of an optimization unit provides for a further sub-task for the machine, taking out the sub-task from the production planning of the optimization unit taking into account the ascertained state of the machine if the production planning provides for a further sub-task for the machine.

The invention discloses a separation between the optimization unit and the distribution unit. This ensures a continuous monitoring of the production means and a continuous production planning, which ensures to adapt the planning to the changed status immediately in the event of changes of the resource state.

Further advantages and advantageous embodiments of the subject-matter of the invention can be taken from the specification, the figures and the claims. Likewise the features listed above and described further below, can according to the invention be used individually or separately or in any combination.

DESCRIPTION OF DRAWINGS

In the following, a working example of the invention is described by means of the figures.

DETAILED DESCRIPTION

Figure 1:
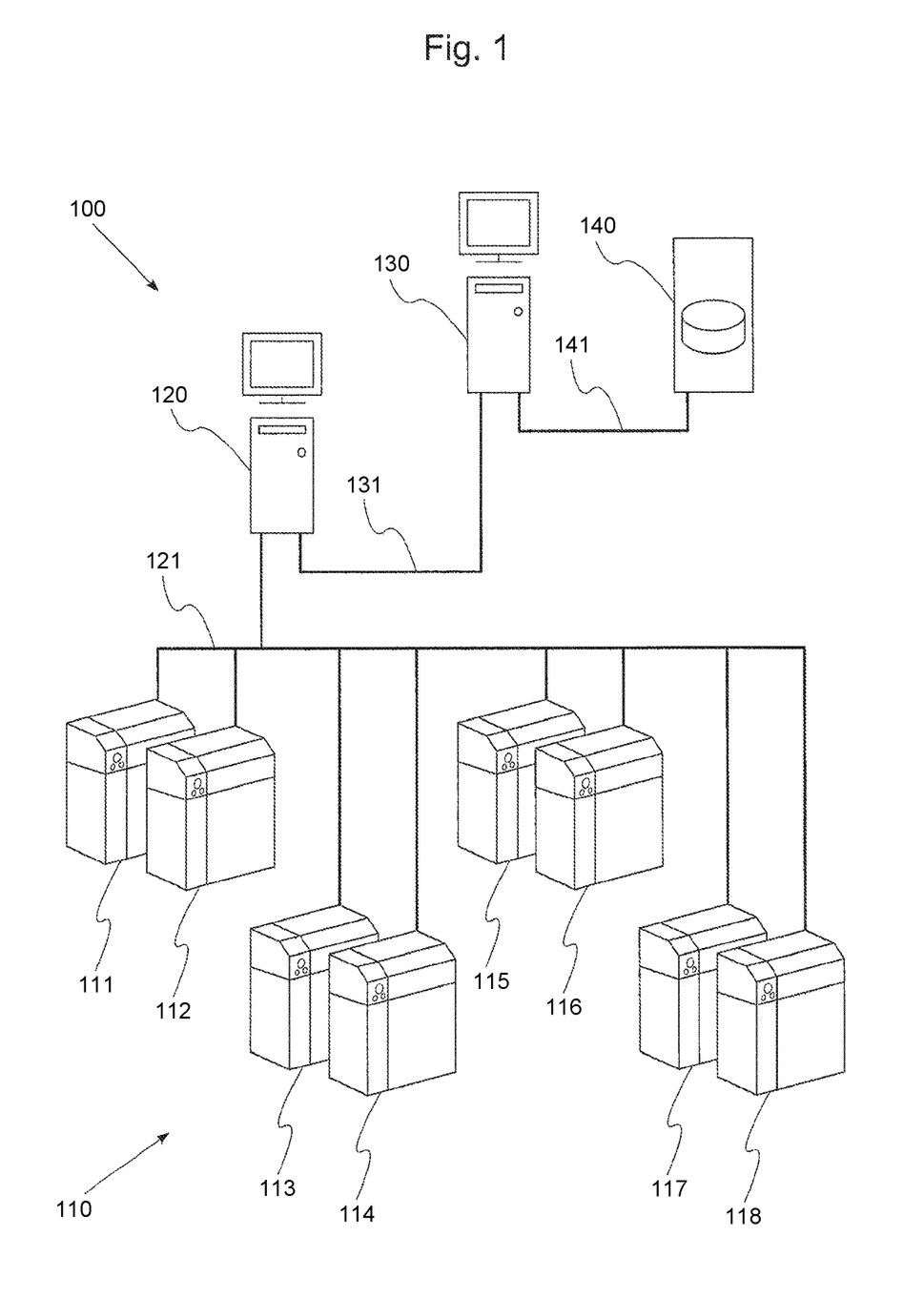
FIG. 1 shows a working example of a production planning system according to the invention.

On the basis of FIG. 1, a working example of a system for production planning according to the present invention is disclosed.

The production planning system 100 according to the invention has a production environment 110. The production environment 110 comprises at least one, but usually several production means in the form of machines 111-118. Machines according to this patent are all devices for the manufacture or processing of products or individual components of products, such as processing systems for laser-processing, for punching or bending, and devices such as laser beam sources, plasma- or induction generators. The specific working example is a production environment for the manufacture of assembled sheet metal components. For this purpose, the production environment 110 has a first cutting machine 111 as a production means and a second cutting machine 112, which can cut sheet metal blanks from an output sheet metal using a laser. Further, the production environment 110 has a first bending machine 113 and a second bending machine 114, which can form a sheet metal blank. Further, the production environment has a first welding robot 115 and a second welding robot 116, which assemble two clamped sheet metal parts at previously predetermined points by spot or seam welding. Further, the production environment 100 has a first painting chamber 117 and a second painting chamber 118, in which sheet metals, sheet metal blanks and assembled sheet metal components can be painted.

The production planning system 100 according to the invention further has a distribution unit 120. The distribution unit 120 is a unit that fulfills the function of recording the current operating status of all resources, and in particular recording whether a resource is ready for operation and in which execution stage of a task the resource is. In the working example the distribution unit 120 is an electronic data processing device that is connected to the production means 111-118 directly by means of a first communication network 121, or by means of control units of the production means 111-118. The distribution unit 120 can request information on the operating status of the production means via appropriate interfaces. Thereby, the distribution unit permanently monitors the operating status of the production environment 110. Although in the working example the distribution unit 120 is an independent data processing device, the functionality can also be executed by an appropriate machine control of a resource or by a server component with other functionalities.

The production planning system according to the invention further has an optimization unit 130. Optimization unit 130 is a unit that fulfills the function of carrying out a production planning. In the working example, the optimization unit 130 is an electronic data processing device connected to the distribution unit 120 by means of a second communication network 131, so that data can be exchanged between the two devices. Although in the embodiment the optimization unit 130 is an independent data processing device, the functionality can also be executed by a server component with other functionalities. In particular, the functionalities of the optimization unit 130 and of the distribution unit 120 can be carried out by a common device. The first communication network 121 and the second communication network 131 can be two different communication networks or may be defined as a common communication network.

The production planning system 100 of the invention further has a data storage unit 140. In the working example, the data storage unit 140 is an electronic data processing device, in particular a database server, which is suitable for and intended for storing data on production means and production tasks, for example in an inventory management system. The data storage unit 140 is connected to the optimization unit 130 by means of a third communication network 141, so that data can be exchanged between both devices. Although the data storage unit 140 in the working example is an independent data processing device, the functionality can also be carried out by other devices, in particular a server component with different functionalities. In particular, the functionalities data storage unit 140, the optimization unit 130 or the distribution unit 120 can be carried out by a common device. The first communication network 121, the second communication network 131 and the third communication network 141 can be different communication networks, or can be designed as common communication networks.

Figure 2:
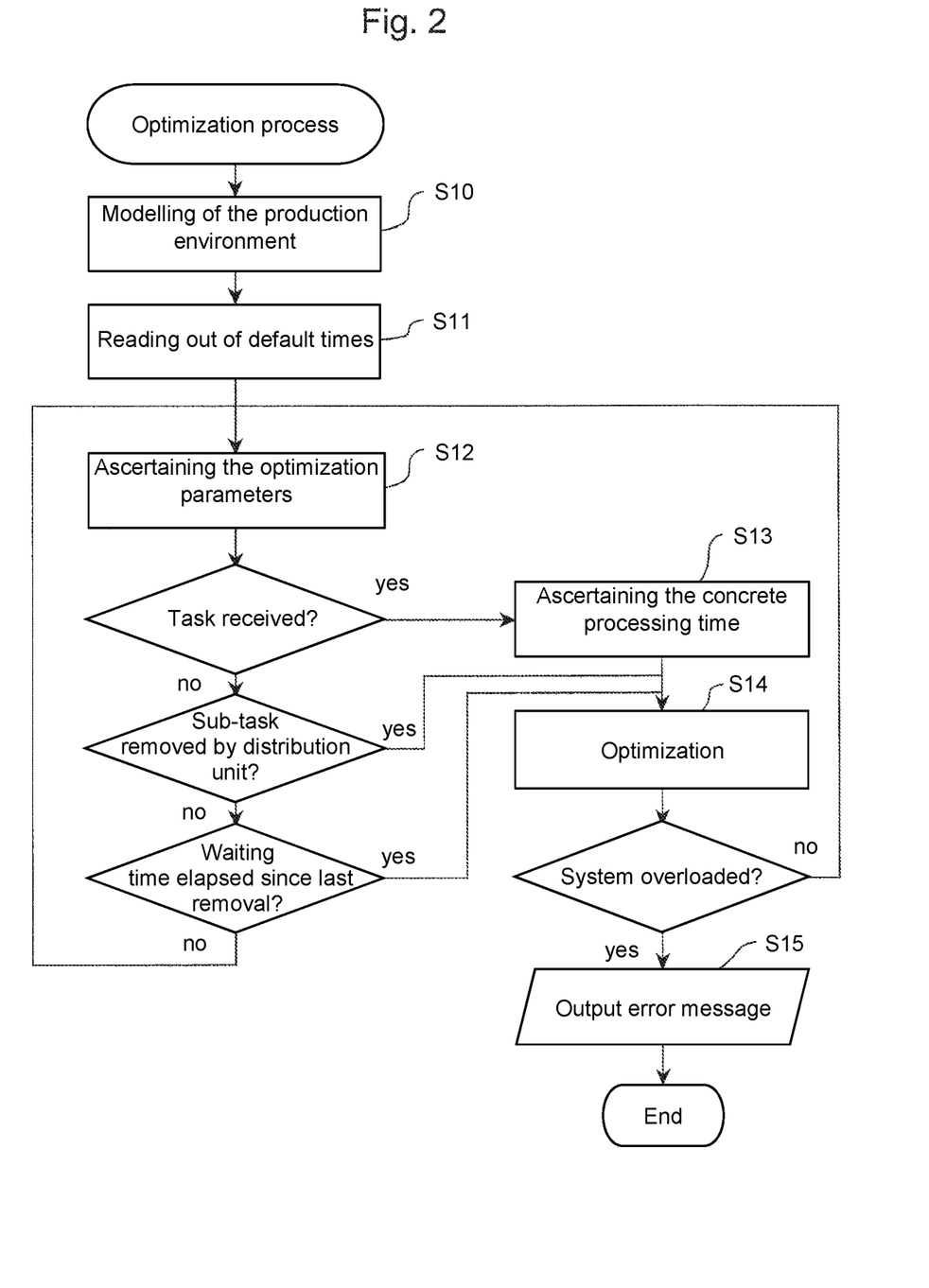
FIG. 2 shows a flowchart of an optimization process of the working example.

By reference to FIG. 2, an optimization unit process of the invention is described.

In a step S10, in the optimization unit, the amount of the production means as a deterministic finite state machine is modelled. Thereby, each production means is described by the steps that have to be passed through in the manufacture of a product. These are in an embodiment:

Set-up step: equipping the machine with a suitable tool.
Loading step: loading the machine with starting material or a blank.
Processing step: processing of the starting material or the blank.
Unloading step: unloading the machine with the processed blank or the finished product.
Transport step: transporting the blank to the next processing step through the next machine.

In a step S11, the working steps with default time, which are for instance stored on the data storage unit 140, are stored in the initial state.

If a task consisting of type, number and sequence of the work steps to be completed and, if applicable, a delivery date of the complete production up to the end product of the total number of pieces is transmitted to the optimization unit 130, the optimization unit 130 first determines in a step S13 an amount of sub-tasks for individual work steps for work stations, and an approximation to the actual time required for the work steps to be completed. Thereby, the optimization unit 130 uses construction plans stored on the data storage unit 140 and determines for instance by means of the sheet metal thickness and cut length the processing time required for the specific processing step of the sheet metal cut. If a specific processing time cannot be determined for a processing step, the predetermined default time is still used.

By the optimization unit 130 a production plan is created in a known manner in step S14 in an optimization process, and the individual work steps are sorted as sub-tasks in work queues of the machines 111-118. Therein, the optimization unit 130 calculates during an optimization process an overall optimum of the system, wherein it can be preset and is previously determined by the optimization unit in step S12, which parameters are optimized. These parameters could be, for example:

Minimization of set-up effort or loading-/unloading effort,
maximization of material utilization,
minimization of machine running time,
minimization of the lead time of a product,
minimization of the processing time of the entire task.

In the event of a system overload, i.e. if the optimization unit cannot determine a production plan, for which all tasks can be completed within the required completion times, in a step S15 a warning message is issued to an operator, and the optimization unit process is terminated. If the optimization process is successfully completed, the optimization unit process returns to step S12.

If no new incoming task is determined and it is determined that a sub-task for one of the machines has been removed by distribution unit 120 and removed from the stock of sub-tasks of the optimization unit, a new optimization process is carried out with step S14. Due to differences of the planned processing time to the actual processing time, a changed production planning can prove to be optimal after removal of the sub-task.

If it is determined that no sub-task has been removed from the optimization unit 130 by the distribution unit 120, and if it is determined that a predetermined time period has elapsed since the last removal of a sub-task by the distribution unit 120, a new optimization process is also carried out with step S14. If a machine 111-118 fails, it can happen that the queue of sub-tasks for this machine is not processed. The still present remaining processing time for these tasks would remain the same, whereas the completion time is constantly being shortened. If the optimization process were to be repeated, these sub-tasks would be sorted into shorter queues primarily compared withless urgent sub-tasks.

If no timeout is detected, the optimization process comes back to step S12. In this way, the optimization unit maintains an optimized production plan for all pending tasks at any point in time.

Figure 3:
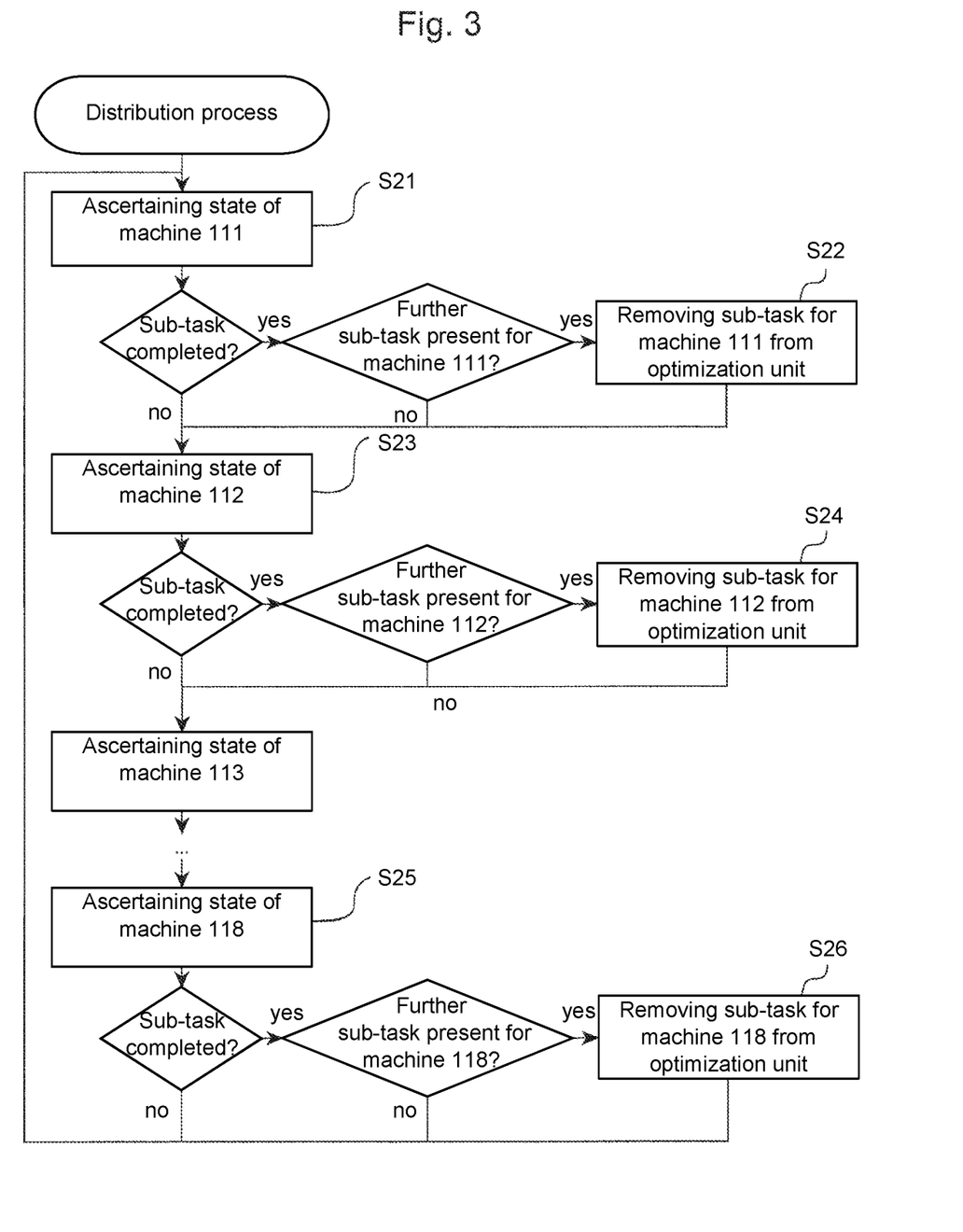
FIG. 3 shows a flowchart of a distribution process of the working example.

By reference to FIG. 3, a distribution unit process of the invention is described.

In a step S21, the condition of the cutting machine 111 is determined by the distribution unit 130. If this reveals that the current sub-task has been processed by the cutting machine 111, then the distribution unit 120 determines whether the optimization unit 130 provides further sub-tasks for the cutting machine 111 in the queue. If this is the case, the distribution unit 120 removes this sub-task for the machine 111 from the optimization unit and transfers the sub-task to the cutting machine 111.

After this, or if it is determined that the cutting machine has not yet completed its current sub-task or that the optimization unit does not have another sub-task for the machine 111 in stock, step S23 is continued.

In the steps S23-S26, the procedure for the cutting machine 111 is repeated for the further machines 112-118.

Figure 4:
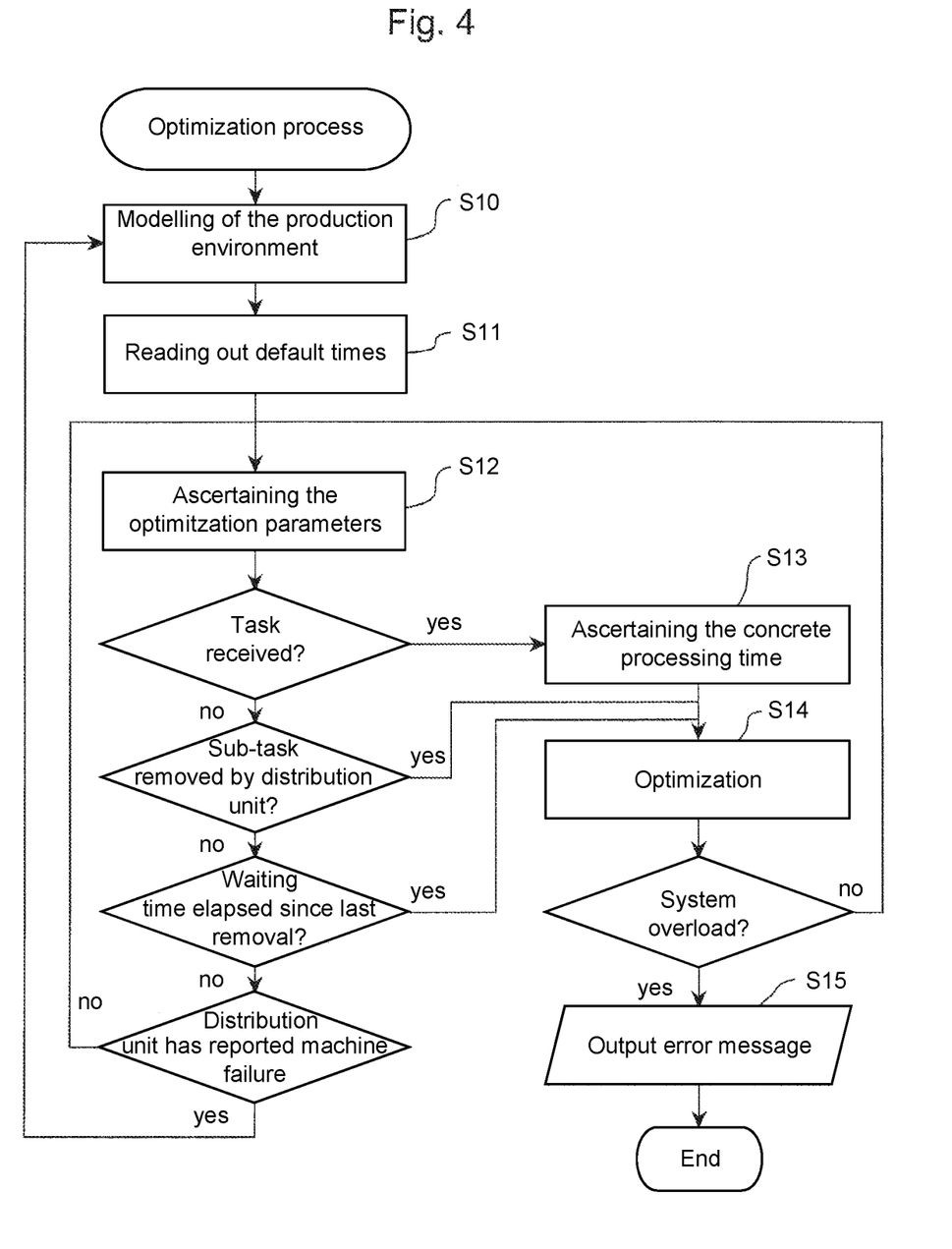
FIG. 4 shows a flowchart of an optimization process of a modified working example.
Figure 5:
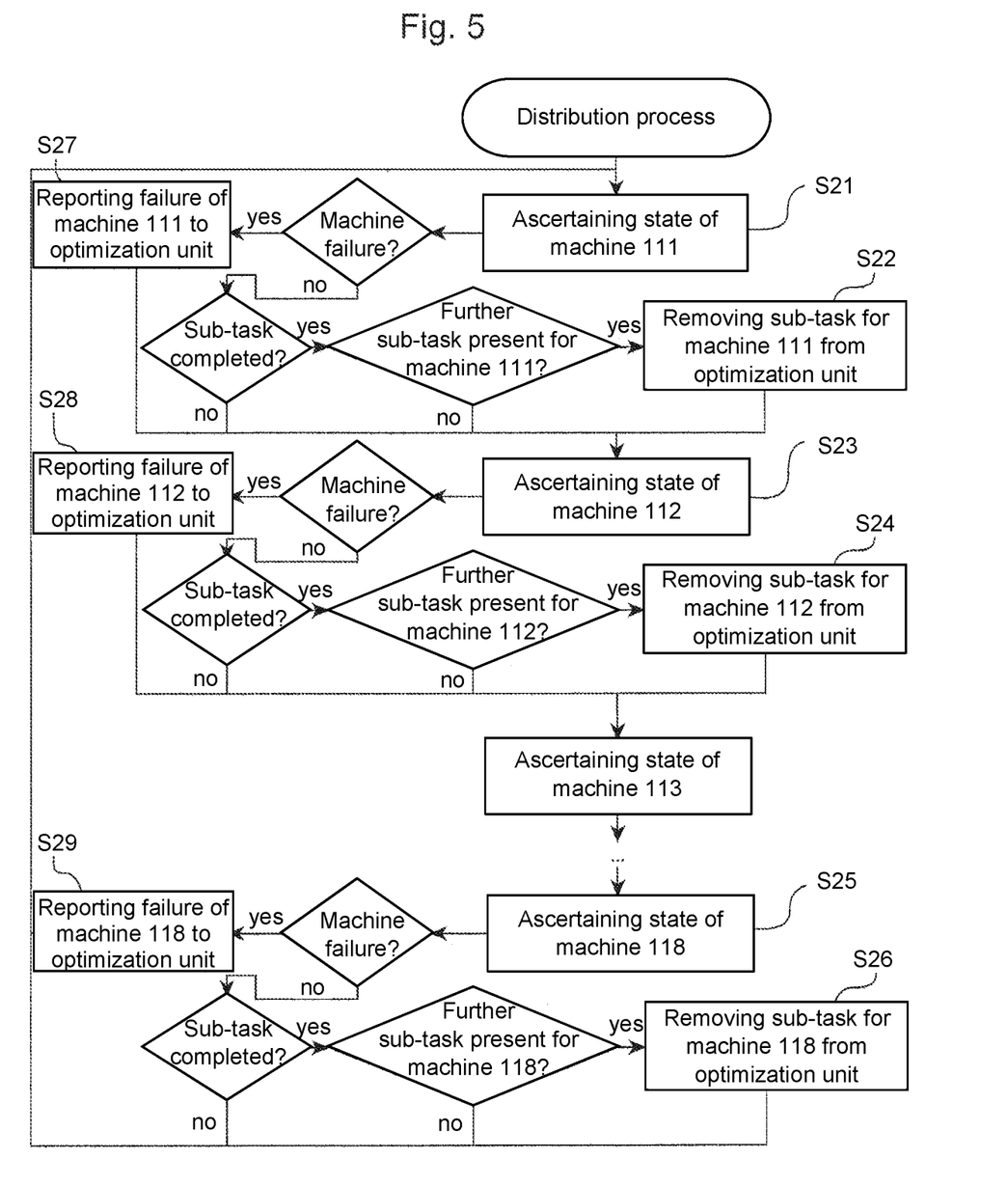
FIG. 5 shows a flowchart of a distribution process of a modified working example.

By reference to FIGS. 4 and 5, a modification of the first working example is described.

The system of the modified working example corresponds to the system of the first working example except for the following differences:

The modified optimization unit process depicted in FIG. 4 determines whether a machine malfunction has been reported by the distribution unit when it is determined that the waiting time has not yet elapsed after their last removal of a sub-task. If this is not the case, it is continued with step S12 as in the first working example. If this is the case, it is returned to step S10 and the production environment is re-modeled under exclusion of the malfunctioned machine.

The modified distribution unit process depicted in FIG. 5 determines after determining the condition of the machine 111 in S21, whether a machine malfunction has occurred. If this is the case, in step S27 the failure of the machine is sent to the optimization unit 130, and then it is proceeded with step S23. If this is not the case, it is proceeded as in the first working example.

Corresponding modifications of the distribution unit process are available for determining the condition of the remaining machines 112-118.

By dividing the production planning into two parts in a distribution function, which records the actual state of the production environment in a rather tightly timed monitoring and, depending on actual availability, takes sub-tasks for a machine and assigns them to the machine and into an optimization function, which only optimizes production planning at relevant times but then automatically, a system can be implemented that models an optimal or almost optimal production plan according to certain criteria at any time. This system is able to react flexibly to new, time-critical tasks or to automatically compensate for the failure of a machine.

The shown and described embodiments are not to be understood as an exhaustive list, but rather have exemplary character for the illustration of the invention. For a person skilled in the art it is apparent that further embodiments are possible within the scope defined by the claims. Accordingly, the model of the production environment in the optimization unit in the working example is designed as a deterministic finite state machine. However, it is also possible to represent the model of the production environment in a different form, for instance as a non-deterministic finite state machine or as an artificial neuronal network.

The junctures "and", "or" and "either . . . or" are used in the meaning which is based on the logical conjunction, the logical adjunction (often "and/or") or the logical contravalence, respectively. A list of process steps is only used to display a set of process steps and does not imply a sequence of process steps in the sequence of the list, unless a sequence is explicitly specified.

What is claimed is:

1. A production optimization system comprising:
   a production environment having at least a first machine and a second machine;
   a distribution unit which is designed to be connected to the first machine and the second machine via a communication network and to ascertain the machine state thereof;
      and an optimization unit which is designed to generate a production plan in which at least one task for producing a product is divided in machine-specific sub-tasks for the first machine or the second machine and being provided for the first machine or the second machine with a sequence,
   wherein the distribution unit is designed to ascertain the next occurring sub-task for the first machine or the second machine from the optimization unit while taking into consideration the respective machine state to remove the sub-task from the production plan, and to assign it to the respective machine,
   wherein the optimization unit is designed to inform an operator of the system thereof if no production plan can be created in which the at least one task for the manufacture of a product is produced within a predetermined timespan, and
   wherein the optimization unit is designed to re-determine the production plan after each removal of a sub-task by the distribution unit or after a predetermined timespan has elapsed after the last removal of a sub-task.

2. The production optimization system according to claim 1, wherein the distribution unit is designed to ascertain the machine state, that is, the readiness for operation or the degree of completion of the currently processed sub-task of the first machine or the second machine and to take into consideration the machine state when assigning the subtasks such that a sub-task is removed from the production planning and assigned to the first machine or the second machine only when the respective machine has completed or almost completed its current sub-task and is ready for operation.

3. The production optimization system according to claim 1, wherein the optimization unit is designed to mathematically model an image of the production environment for production planning, to determine at least one optimization parameter, to divide at least one production task as production plan in sub-tasks and to provide for the first machine or the second machine, such that the production plan is optimal or almost optimal after the at least one optimization parameter.

4. The production optimization system according to claim 1, wherein the optimization parameter is the minimization of the set-up effort or loading/unloading effort, the maximization of material utilization, the minimization of the machine running time, the minimization of the throughput time of a product or the minimization of the processing time of the entire task.

5. The production optimization system according to claim 1, wherein the optimization unit is designed to model the operating environment as a finite state machine.

6. The production optimization system according to claim 5, wherein the finite state machine comprises a deterministic finite state machine or an artificial neuronal network.

7. The production optimization system according to claim 1, wherein the optimization unit is designed to optimize the production plan according to the optimization parameter after each withdrawal of a sub-task by the distribution unit or after a predetermined timespan has elapsed after the last withdrawal of a sub-task.

8. The production optimization system according to claim 1, wherein the distribution unit is designed to detect an operating fault of the first machine or the second machine and to transmit it to the optimization unit, and
the optimization unit is designed to re-model the image of the operation environment to the exclusion of the malfunctioning machine upon receipt of the notification of the malfunction.

9. An optimization process carried out by an optimization unit, the optimization process comprising the steps:
   modelling of a production environment having at least one machine,
   receiving at least one task for producing a product,
   generating sub-tasks from one task as work steps for at least one machine,
   assigning the sub-tasks to the at least one machine as a production plan after receiving a task or after removal of a sub-task by a distribution unit or after expiry of a predetermined timespan after the last removal of the sub-task by the distribution unit;
   informing an operator if no production plan can be created in which the at least one task for producing the product is produced within a predetermined timespan; and
   re-determining the production plan after each removal of a sub-task by the distribution unit or after a predetermined timespan has elapsed after the last removal of a sub-task.

10. The optimization process according to claim 9, wherein the process further comprises the steps:
    determination of optimization parameters,
    optimization of the production plan according to the optimization parameters.

11. The optimization process according to claim 9, wherein the process further comprises the steps:
    ascertain of standard durations for sub-tasks,
    ascertain of sub-task-specified durations, taking into account the construction of the work piece.

12. The optimization process according to claim 9, wherein the step of modelling a production environment with at least one machine models it as a finite state machine.

13. The production optimization process according to claim 12, wherein the finite state machine comprises a deterministic finite state machine or an artificial neuronal network.

14. The optimization process according to claim 9, further comprising the steps:
    receiving notification of a fault in the at least one machine from the distribution unit,
    repeatedly performing the modelling of a production environment excluding the disturbed machine.

15. A distribution method carried out according to a distribution unit and an optimization unit, comprising the steps:
    ascertaining the state of at least one machine from a production environment, ascertaining whether the production planning of the optimization unit provides for a further sub-task for the machine, removing the sub-task from the production planning of the optimization unit, taking into account the determined state of the machine, if the production planning provides for a further sub-task for the machine, informing an operator by the optimization unit if no production plan can be created in which at least one task for producing a product is produced within a predetermined timespan, and re-determining the production plan after each removal of a sub-task from the optimization unit or after a predetermined timespan has elapsed after the last removal of a sub-task.

16. The distribution method according to claim 15, further comprising the step:

ascertaining the operational readiness state of the machine, and transferring the operational readiness state of the machine to the optimization unit if it is not operational.

* * * * *